Sept. 20, 1960 P. S. MAGNA 2,953,172
APPARATUS FOR RECEIVING AND FEEDING LOOSE ARTICLES
Filed May 23, 1958
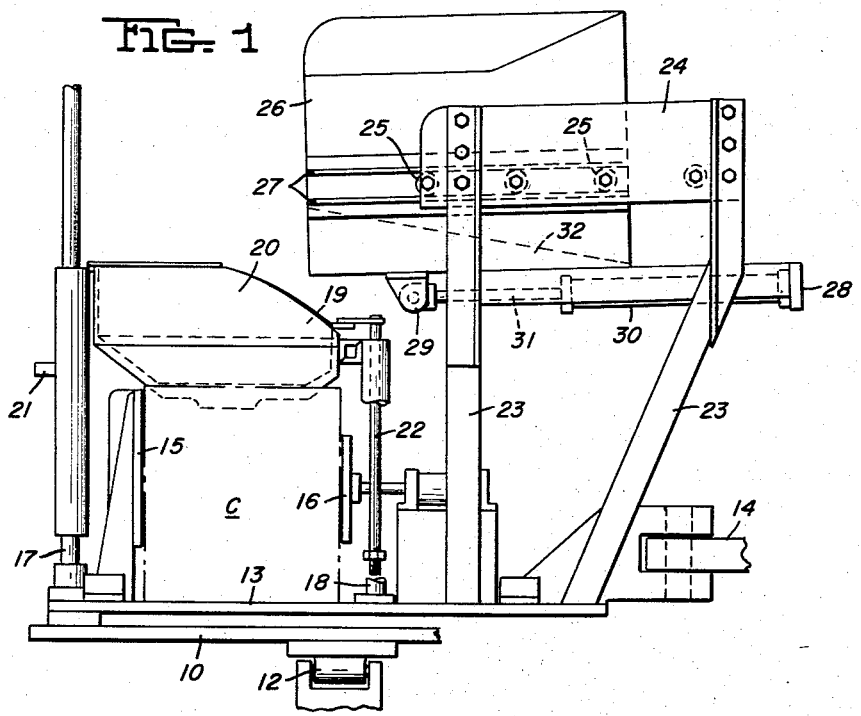
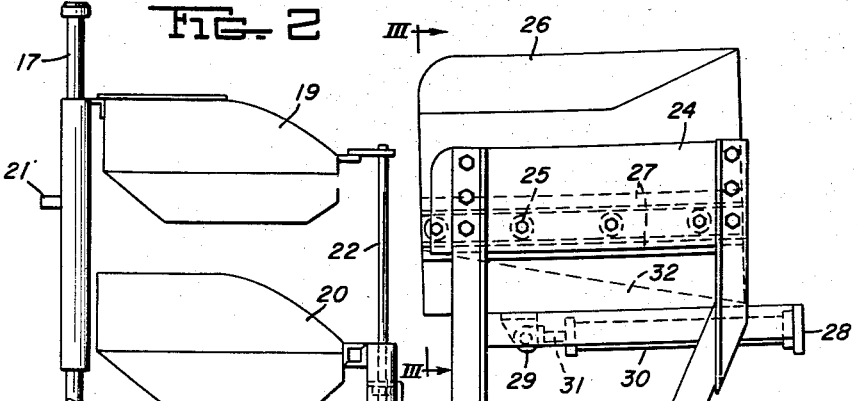
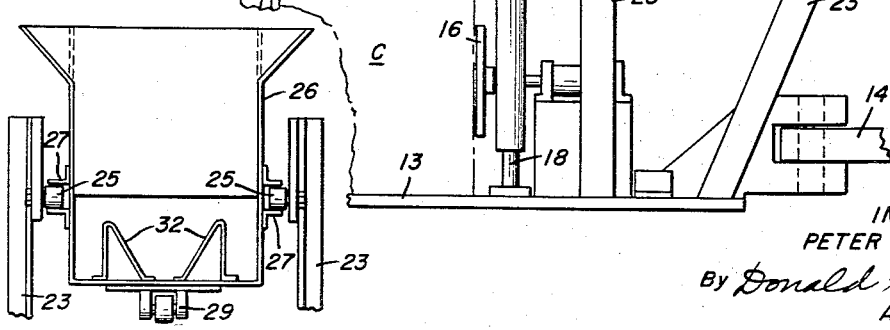
INVENTOR
PETER S. MAGNA
By Donald G. Dalton
Attorney

2,953,172
APPARATUS FOR RECEIVING AND FEEDING LOOSE ARTICLES

Peter S. Magna, 154 Sierra Drive, Pittsburg, Calif.

Filed May 23, 1958, Ser. No. 737,412

4 Claims. (Cl. 141—233)

This invention relates to a hopper for receiving and feeding loose articles.

The hopper is particularly suited for use in packaging machines of the type shown in Scott D. Warner application Serial No. 601,140, filed July 31, 1956 (now Patent No. 2,880,763), and in my joint application with William E. McCormick Serial No. 656,460, filed May 1, 1957. (not Patent No. 2,874,737). These machines comprise a turntable, a plurality of container-mounting assemblies supported on the turntable, and a drive for periodically indexing the turntable. One container-mounting assembly is positioned for insertion of an empty container and removal of a previously filled container, another for receiving loose articles in a container mounted therein, and the others for shaking filled containers to compact the articles. Each time the turntable indexes, the first assembly moves to the position the second formerly occupied, and so on around. Each container-mounting assembly includes a shaking platform, means on the platform for confining a container, a vertically movable funnel, and a hopper. The funnel normally is lowered within the container, and a portion of the hopper overlies an edge of the funnel. Thus articles can be dumped into the hopper, and the hopper and funnel guide them into the container. However, before an empty container can replace a filled container, the overlying portion of the hopper must be retracted and the funnel withdrawn from the container. The machines also comprise mechanism for automatically accomplishing these operations and subsequently returning the funnel and hopper.

Hoppers previously used in these machines are fixed to the respective shaking platforms. They carry a separately retractable lip which normally overlies the funnel, and a fluid pressure cylinder for moving the lip. This arrangement has disadvantages that articles often spill or become jammed between the hopper and lip and thus prevent operation of the machine. Freeing such a jam sometimes damages the hopper and causes undue maintenance.

An object of the present invention is to provide an improved hopper which overcomes the difficulties of previous hoppers, that is, a hopper which eliminates any likelihood of spilling or jamming.

A more specific object is to provide a hopper which itself is movably mounted on a relatively fixed support, thus eliminating the need for a separately movable lip subject to jamming or allowing spillage.

In accomplishing these and other objects of the invention, I have provided improved details of structure, a preferred form of which is shown in the accompanying drawing, in which:

Figure 1 is a side elevational view of a container-mounting assembly similar to those shown in my aforesaid joint application, but equipped with a hopper constructed in accordance with the present invention;

Figure 2 is a view similar to Figure 1, but showing the hopper retracted and the funnel raised; and Figure 3 is an end elevational view of the hopper on line III—III of Figure 2.

Figures 1 and 2 show a portion of a turntable 10, one of the supporting rollers 12 for the turntable, and one container-mounting assembly. The assembly includes a platform 13 and a mechanical connection 14 for shaking the platform. A vertical abutment 15 and a clamping member 16 are mounted on the platform for confining a container C therebetween. The machine of course includes drive mechanisms for indexing the turntable and shaking the platforms and means for feeding empty containers and receiving filled containers, but these parts can be similar to those shown in the aforesaid Warner application and hence their showing is not repeated.

The assembly is illustrated as equipped with a dual funnel or hopper device constructed as shown in my aforesaid joint application. This device includes an outboard pair of vertical guide rods 17 and an inboard pair of vertical guide rods 18 fixed to platform 10. A primary funnel 19 is slidably supported on the outboard guide rods 17, and a secondary funnel 20 on the inboard guide rods 18. In the lowered position of the funnels shown in Figure 1, the secondary funnel 20 extends into the container C and the primary funnel 19 fits within the secondary funnel. The primary funnel 19 carries a lifting lug 21 adapted to be engaged by a suitable lifter, not shown, for withdrawing the primary funnel from the secondary funnel 20. The primary funnel also carries a depending rod 22 engageable with the secondary funnel for withdrawing the latter from the container, thus moving the funnels to the position shown in Figure 2. Reference can be made to my joint application for a more complete description of this mechanism. It is apparent also that the hopper of the present invention can be used with a single funnel, as shown in the Warner application.

In accordance with the present invention, a pair of spaced apart upstanding angle iron frames 23 are fixed to platform 13 inwardly of the inboard guide rods 18. The upper portions of the respective frames carry a pair of opposed bars 24 at a height above the funnel device when the latter is lowered as shown in Figure 1. A plurality of rollers 25 are journaled to the opposed inner faces of the two bars 24. The axes of these rollers lie in a common plane which slopes downwardly toward the funnel device 19, 20 when the latter is lowered. A hopper 26 is movably supported on rollers 25, having channel shaped guideways 27 fixed to the exterior of its side walls and receiving the rollers. An angle iron yoke 28 connects the inner portions of the two frames 23 immediately below the hopper. A lug 29 depends from the underside of the hopper floor. A double-acting fluid pressure cylinder 30 is attached to yoke 28 and contains a piston and piston rod 31 attached to lug 29 for projecting and retracting the hopper. The cylinder has suitable connections for admitting and discharging fluid, not shown since they can be similar to those shown in the Warner application.

When the hopper 26 is projected and the funnel device 19, 20 lowered as shown in Figure 1, the outer edge of the hopper overlies the upper edge of the funnel device. The hopper floor slopes downwardly toward the funnel device, and preferably carries a pair of upstanding vanes 32. Thus loose articles, such as nails, dumped into the hopper feed therefrom into the funnel device and thence into the container C without spilling. The shaking action of the hopper assists in this action, and the vanes tend to distribute the articles uniformly across the width. When the hopper is retracted as shown in Figure 2, the funnel device can be raised and lowered without interference.

The present invention overcomes need for a separately movable lip on the hopper and thus avoids jamming or spilling. It is apparent also that the invention has broader application where similar problems arise in moving a hopper out of the way of other mechanism.

While I shown and described only a single embodiment of my invention, it is apparent that modifications may arise. Therefore, I do not wish to be limited to the disclosure set forth but only by the scope of the appended claims.

I claim:

1. A container-filling device comprising means for positioning a container, a vertically movable funnel normally extending into the container, means operatively connected with said funnel and adapted to be engaged for raising said funnel to leave said positioning means unobstructed, whereby containers can be inserted sideways into said positioning means and removed sideways therefrom without interference from said funnel, a pair of spaced apart frames adjacent said positioning means, a plurality of rollers journaled on said frames with their axes lying in a common plane sloping downwardly toward said positioning means, a hopper mounted on said rollers and normally projecting over an edge of said funnel for feeding loose articles thereto, said hopper being bodily movable on said rollers to clear said funnel so that said funnel can be raised from the container, and motive means on said frames for moving said hopper.

2. In a packaging machine for loose articles, which comprises means for positioning a container, a vertically movable funnel normally extending into a container confined in said positioning means, and means operatively connected with said funnel and adapted to be engaged for raising said funnel to leave said positioning means unobstructed, whereby containers can be inserted sideways into said positioning means and removed sideways therefrom without interference from said funnel, the combination therewith of a device for feeding articles to said funnel comprising a support adjacent said positioning means, a hopper mounted on said support and being movable with respect thereto, said hopper normally projecting over an edge of said funnel so that articles dumped in the hopper can feed directly into the funnel without spilling, said hopper being retractable as a unit to clear said funnel so that said funnel can be raised from the container, and motive means on said support for moving said hopper.

3. In a packaging machine for loose articles, which comprises means for positioning a container, a vertically movable funnel normally extending into a container confined in said positioning means, and means operatively connected with said funnel and adapted to be engaged for raising said funnel to leave said positioning means unobstructed, whereby containers can be inserted sideways into said positioning means and removed sideways therefrom without interference from said funnel, the combination therewith of a device for feeding articles to said funnel comprising a pair of spaced apart frames adjacent said positioning means, a plurality of rollers journaled on said frames with their axes lying in a common plane sloping downwardly toward said positioning means, a hopper mounted on said rollers and normally projecting over an edge of said funnel so that articles dumped in the hopper can feed directly into the funnel without spilling, said hopper being bodily movable on said rollers to clear said funnel so that said funnel can be raised from the container, and motive means on said frames for moving said hopper.

4. In a packaging machine for loose articles, which comprises means for positioning a container, a vertically movable funnel normally extending into a container confined in said positioning means, and means operatively connected with said funnel and adapted to be engaged for raising said funnel to leave said positioning means unobstructed, whereby containers can be inserted sideways into said positioning means and removed sideways therefrom without interference from said funnel, the combination therewith of a device for feeding articles to said funnel comprising a pair of spaced apart frames adjacent said positioning means, a plurality of rollers journaled on said frames with their axes lying in a common plane sloping downwardly toward said positioning means, a hopper having channel-shaped guideways fixed to its side walls and riding on said rollers, said hopper normally projecting over an edge of said funnel so that articles dumped in the hopper can feed directly into the funnel without spilling, said hopper being bodily movable on said rollers to clear said funnel so that said funnel can be raised from the container, and a fluid pressure cylinder and piston connected between said frames and the underside of said hopper for moving said hopper.

References Cited in the file of this patent

UNITED STATES PATENTS

| 247,220 | Smith et al. | Sept. 20, 1881 |
| 553,854 | Hunter | Feb. 4, 1896 |
| 1,667,930 | Edmunds | May 1, 1928 |
| 2,075,931 | Eades | Apr. 6, 1937 |
| 2,524,391 | Legrow | Oct. 3, 1950 |
| 2,744,670 | Bendot | May 8, 1956 |
| 2,766,782 | Bell et al. | Oct. 16, 1956 |
| 2,873,772 | Prenk | Feb. 17, 1959 |